United States Patent [19]

Hamilton et al.

[11] 4,190,578

[45] Feb. 26, 1980

[54] DIALYSIS MONITORED PREPARATION OF METAL SALTS OF AZO PIGMENTS

[75] Inventors: Alexander Hamilton; Colin Nelson, both of Glasgow, Scotland

[73] Assignee: Ciba-Geigy Corporation, Ardsley, N.Y.

[21] Appl. No.: 846,299

[22] Filed: Oct. 28, 1977

[30] Foreign Application Priority Data

Oct. 28, 1976 [GB] United Kingdom ............... 44771/76

[51] Int. Cl.$^2$ ..................... C09B 45/14; C09B 45/16; C09B 45/18; C09B 45/20

[52] U.S. Cl. .............................. 260/150; 106/288 Q; 106/309; 260/141; 260/144; 260/146 R; 260/149; 260/151; 260/208

[58] Field of Search ................ 260/141 P, 144 P, 150, 260/151, 149, 146 R, 208; 106/288 Q, 309

[56] References Cited

U.S. PATENT DOCUMENTS

| 3,344,131 | 9/1967 | Uehlinger | 260/151 X |
|---|---|---|---|
| 3,522,231 | 7/1970 | Bitterlin | 260/151 X |
| 3,526,617 | 9/1970 | Fuchs et al. | 260/151 X |
| 3,939,141 | 2/1976 | Meininger et al. | 260/151 |

FOREIGN PATENT DOCUMENTS

| 1934388 | 4/1971 | Fed. Rep. of Germany | 260/144 |
|---|---|---|---|
| 2635536 | 2/1977 | Fed. Rep. of Germany | 260/144 |

*Primary Examiner*—Floyd D. Higel
*Attorney, Agent, or Firm*—Joseph F. DiPrima

[57] ABSTRACT

Azo dyestuff coupling process in which the amount of excess diazo or coupling component is continuously monitored and the addition of diazo component or coupling component to the reaction is automatically controlled by means of an automatic chemical analyzer which incorporates a dialyzer module, which process is characterized in that azo metal salt pigments derived from sulphonated intermediates can be obtained by precipitating the pigment by adding a water-soluble metal salt to the water-soluble sulphonated azo dyestuff at some stage prior to the passage of the sample stream through the dialyzer.

6 Claims, No Drawings

DIALYSIS MONITORED PREPARATION OF METAL SALTS OF AZO PIGMENTS

The present invention relates to the preparation of azo pigments and more particularly to a method for the automatic control of azo coupling processes in the manufacture of azo pigments.

In the German Offenlegungsschrift No. 2,635,536 there is described an azo pigment coupling process in which the amount of excess diazo or coupling component is continuously monitored and the addition of diazo component or coupling component to the reaction is automatically controlled by means of an automatic chemical analyser incorporating a dialyser module.

We also state that the diazonium salt used in the coupling process may be prepared from any diazotisable amine which on coupling with a suitable coupling component results in a water-insoluble azo pigment.

Normally, amines and coupling components containing sulphonic acid groups, after coupling, give rise to azo dyestuffs which are water-soluble to some extent. The manufacture of these products cannot be automatically controlled by the automatic chemical analyser in the manner described in German Offenlegungsschrift No. 2,635,536 since they can diffuse through the dialyser membrane and thus interfere with the colorimetric measurement on which the control system is based.

One well-known and important group of pigments, the azo metal salt pigments, is however derived from sulphonated intermediates which on coupling produce azo dyestuffs which are at least partially water-soluble. The water-insoluble pigments are made by precipitating these dyestuffs with water-soluble metal salts the most important of which are the salts of calcium, barium, strontium, and manganese. We have now found that the automatic chemical analyser can be used to control the manufacture of these pigments in the same manner as in German Offenlegungsschrift No. 2,635,536 provided that the precipitation process takes place at some stage prior to the passage of the sample stream through the dialyser.

Moreover, the excess diazo or coupling component can be continuously monitored in the preparation of the corresponding water-soluble azo dyestuffs if a precipitating metal salt is injected into the Auto Analyser sample stream before its passage through the dialyser, and afterwards the sample stream is run to waste.

In one embodiment of the present invention there is provided a modification of the azo pigment coupling process claimed in German Offenlegungsschrift No. 2,635,536 which extends its use to the preparation of azo metal salt pigments derived from sulphonated intermediates which comprises precipitating the pigment by adding a water-soluble metal salt to the water-soluble sulphonated azo dyestuff at some stage prior to the passage of the sample stream through the dialyser.

This is most easily accomplished by carrying out the azo coupling process in the presence of the precipitating metal salt so that coupling and precipitation takes place simultaneously.

In another embodiment of the present invention there is provided a modification of the process claimed in German Offenlegungsschrift No. 2,635,536 which extends its use to the preparation of water-soluble sulphonated azo dyestuffs which comprises injecting a precipitating metal salt into the Auto Analyser sample stream before its passage through the dialyser, after which the sample stream is run to waste.

In both embodiments of this invention, Examples of sulphonated amines that may be used are as follows:
aniline-4-sulphonic acid
aniline-2:5-disulphonic acid
4-chloro-aniline-3-sulphonic acid
3-carboxy-4-chloraniline-6-sulphonic acid
3:4-dichloraniline-6-sulphonic acid
2-nitroaniline-4-sulphonic acid
2-aminotoluene-6-sulphonic acid
3-aminotoluene-6-sulphonic acid
4-aminotoluene-2-sulphonic acid
4-aminotoluene-3-sulphonic acid
2-chloro-4-aminotoluene-5-sulphonic acid
2-chloro-5-aminotoluene-4-sulphonic acid
2-chloro-5-aminoethylbenzene-4-sulphonic acid
2-chloro-5-amino-isopropylbenzene-4-sulphonic acid
3-amino-4-methoxy-toluene-6-sulphonic acid
1-naphthylamine-4-sulphonic acid
2-naphthylamine-1-sulphonic acid
2naphthylamine-5-sulphonic acid
2-naphthylamine-6-sulphonic acid Among suitable sulphonated coupling components may be listed:
1-naphthol-5-sulphonic acid
2-naphthol-6-sulphonic acid
2-naphthol-3:6-disulphonic acid These sulphonated amines may be combined with any of the coupling components listed in copending U.S. Patent Application Ser. No. 837,654, filed Sept. 29, 1977 as well as the sulphonated coupling components presently listed while the sulphonated coupling components may also be combined with any of the amines listed in copending U.S. Patent Application Ser. No. 837,654, filed Sept. 29, 1977. The production of pigments from mixtures of any two or more of the amines listed in this application and copending U.S. Patent Application Ser. No. 837,654, filed Sept. 29, 1977 with any one of the coupling components listed in this application and copending U.S. Patent Application Ser. No. 837,654, filed Sept. 29, 1977 is covered as well as the production of pigments from any one of the amines listed in this application or copending U.S. Patent Application Ser. No. 837,654, filed Sept. 29, 1977 with any two or more of the coupling components from those listed in copending U.S. Patent Application Ser. No. 837,654, filed Sept. 29, 1977 and in this application. Products derived from mixtures of two or more of the amines and mixtures of two or more of the coupling components listed in the two applications are also covered.

Among the metal salts which are suitable for the precipitation process are the water-soluble inorganic or organic salts of the following metals: aluminium, cadmium, chromium, cobalt, copper, iron, lead, magnesium, mercury, nickel, tin, titanium, zinc and preferably calcium, barium, strontium, and manganese.

The amount of metal salt must normally be at least stoichiometrically equivalent to the amount of sulphonated dyestuff present and most pigment processes of this type employ an excess of salt to ensure full precipitation.

Other additives normally used to modify pigment processes such as resins, fatty acids and amines, and other surface-active agents may also be present.

The method of application of the automatic chemical analyser is described in co-pending U.S. Patent Application Ser. No. 837,654, filed Sept. 29, 1977.

The following Examples further describe the present invention.

EXAMPLE 1

In a process for the preparation of Colour Index Pigment Red 57:1 an aqueous slurry containing 39.0 parts 4-aminotoluene-3-sulphonic acid in diazotised form and 39.2 parts calcium chloride made to a total of 1,650 parts is added to a stirred reaction vessel simultaneously with 1,650 parts of an alkaline aqueous solution containing 40.0 parts 2-hydroxy-3-naphthoic acid and 22.0 parts STAYBELITE ® Resin (a hydrogenated rosin). The pH is controlled throughout at 10.8–11.0 and the temperature at 9°–10° C. While the diazo/calcium chloride slurry is added at a fixed rate the rate of addition of the 2-hydroxy-3-naphthoic acid/resin solution is automatically controlled to maintain a small fixed excess of 2-hydroxy-3-naphthoic acid throughout. This is achieved by using the Auto Analyser to continuously analyse the contents of the reaction vessel for 2-hydroxy-3-naphthoic acid and then using a signal from the Auto Analyser to regulate the rate of addition of the 2-hydroxy-3-naphthoic acid solution to the reaction. For continuous production pigment slurry can be removed continuously from the coupling reaction and passed to further process stages.

EXAMPLE 2

2,200 parts of an aqueous slurry containing 92.4 parts 2-chloro-4-aminotoluene-5-sulphonic acid in diazotised form and 78.4 parts calcium chloride are reacted with 2,200 parts of an alkaline aqueous solution containing 80.0 parts 2-hydroxy-3-naphthoic acid and 29.5 parts tall oil rosin by simultaneous introduction into a stirred reactor at a pH in the range 10.6 to 11.0 and at a temperature of 10° C. The diazo/calcium chloride mixture is added to the reaction vessel at a fixed rate. The rate of addition of the 2-hydroxy-3-naphthoic acid/rosin solution is automatically controlled by the Auto Analyser to maintain a small fixed excess of coupling component throughout coupling. The resulting slurry of Colour Index Pigment Red 48:2 is removed continuously from the reactor and subjected to standard finishing procedures to give a dry powder pigment.

EXAMPLE 3

Colour Index Pigment Red 63:1 is produced continuously by feeding simultaneously into a stirred reactor 2,300 parts of an aqueous slurry containing 92.5 parts of diazotised 2-naphthylamine-1-sulphonic acid and 100.0 parts of calcium chloride at a fixed rate and 2,300 parts of an alkaline aqueous solution containing 80.0 parts of 2-hydroxy-3-naphthoic acid, 35.5 parts of Beckacite ® 1624 Resin, and 35.5 parts of WW Gum Rosin at such a rate that a small fixed excess of 2-hydroxy-3-naphthoic acid is present in the reaction mixture throughout the whole process. This is achieved by using the Auto Analyser to sample the reactor contents and automatically analyse them for 2-hydroxy-3-naphthoic acid content on a continuous basis. In the Auto Analyser the 2-hydroxy-3-naphthoic acid passes through the dialysis membrane into a water stream in direct proportion to its concentration in the reaction mixture and it is measured colorimetrically by reaction with acidic ferric chloride to give a blue coloration with a λ max. of 570 nm. A signal from the Auto Analyser is then used to adjust the rate of addition of the coupling component solution. The product slurry is removed from the reactor on a continuous basis and finished by standard pigment finishing techniques.

what is claimed is:

1. An azo, sulfonated dyestuff process in which the amount of excess sulfonated diazo or coupling component is continuously monitored and the addition of diazo component or coupling component to the reaction is automatically controlled by means of an automatic chemical analyser which incorporates a dialyzer module, wherein an azo metal sulfonate salt pigment of a water-soluble sulfonated dyestuff is obtained by adding the corresponding water-soluble aluminum, cadmium, chromium, cobalt, copper, iron, lead, magnesium, mercury, nickel, tin, titanium, zinc, calcium, barium, strontium or manganese metal salt to said water-soluble sulfonated azo dyestuff at some stage prior to the passage of the sample through the dialyser.

2. A process as claimed in claim 1 in which the azo coupling process is carried out in the presence of the precipitating metal salt so that coupling and precipitation take place simultaneously.

3. An azo dyestuff coupling process according to claim 1, in which the amount of excess diazo or coupling component is continuously monitored and the addition of diazo component or coupling component to the reaction is automatically controlled by means of an automatic chemical analyser which incorporates a dialyser module, wherein a water-soluble dyestuff is obtained as a coupling reaction product, removing a sample stream from said reaction product, and precipitating said water-soluble dyestuff from said sample by injecting the precipitating metal salt into the sample stream before its passage through the dialyser.

4. A process as claimed in claim 1 in which the metal salt is the water-soluble inorganic or organic salt of calcium, barium, strontium or manganese.

5. A process as claimed in claim 1 in which metal salt is calcium chloride.

6. A process as claimed in claim 1 in which the amount of metal salt is at least stoichiometrically equivalent to the amount of sulphonated dyestuff present.

* * * * *